(12) United States Patent
Nguyen et al.

(10) Patent No.: US 11,610,467 B2
(45) Date of Patent: Mar. 21, 2023

(54) SYSTEM AND TECHNIQUE FOR DETECTING CLEANING CHEMICAL USAGE TO CONTROL CLEANING EFFICACY

(71) Applicant: Ecolab USA Inc., Saint Paul, MN (US)

(72) Inventors: Donna Thi Nguyen, Raleigh, NC (US); Conor Sylvester Smith, Saint Louis Park, MN (US); Daniel Wald, Burnsville, MN (US); Amani Eltahir Babekir, Greensboro, NC (US); Kyle David Wood, Rosemount, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 17/494,926

(22) Filed: Oct. 6, 2021

(65) Prior Publication Data

US 2022/0114875 A1    Apr. 14, 2022

Related U.S. Application Data

(60) Provisional application No. 63/089,227, filed on Oct. 8, 2020.

(51) Int. Cl.
| | | |
|---|---|---|
| *G08B 21/18* | (2006.01) | |
| *G01L 19/00* | (2006.01) | |
| *G01P 15/18* | (2013.01) | |

(52) U.S. Cl.
CPC .......... *G08B 21/18* (2013.01); *G01L 19/0038* (2013.01); *G01P 15/18* (2013.01)

(58) Field of Classification Search
CPC ...... G08B 21/18; G01L 19/0038; G01P 15/18
See application file for complete search history.

(56) References Cited

U.S. PATENT DOCUMENTS

| | | |
|---|---|---|
| 2,560,317 A | 7/1951 | Wallace |
| 3,643,102 A | 2/1972 | Craik et al. |
| 4,111,034 A | 9/1978 | Hubner |
| 4,115,263 A | 9/1978 | Frederic |
| 4,733,798 A | 3/1988 | Brady et al. |

(Continued)

FOREIGN PATENT DOCUMENTS

| | | |
|---|---|---|
| AU | 3705100 A | 9/2000 |
| AU | 2004244177 A1 | 12/2004 |

(Continued)

OTHER PUBLICATIONS

International Patent Application No. PCT/US2021/053688, "International Search Report and Written Opinion" dated Feb. 16, 2022, 26 pages.

*Primary Examiner* — Hongmin Fan
(74) *Attorney, Agent, or Firm* — Fredrikson & Byron, P.A.

(57) ABSTRACT

A system may monitor usage of a cleaning chemical and indicate when the chemical has expired and needs to be replaced. In some examples, the system includes a reservoir containing the chemical and a sensor associated with the reservoir that can detect user interaction with the chemical in the reservoir. The system may track an amount of time until the chemical in the reservoir is deemed to have expired and provide a user alert indicating expiration of the chemical. The system can control the amount of time remaining until the chemical is deemed to have expired based on the detected addition of the object to the reservoir.

25 Claims, 7 Drawing Sheets

(56) References Cited

U.S. PATENT DOCUMENTS

| | | | |
|---|---|---|---|
| 4,756,321 A | 7/1988 | Livingston et al. |
| 4,883,057 A | 11/1989 | Broderick |
| 5,500,050 A | 3/1996 | Chan et al. |
| 5,536,663 A | 7/1996 | Mueller-Kirschbaum et al. |
| 5,938,903 A | 8/1999 | Broderick |
| 6,026,530 A | 2/2000 | Camp, Jr. |
| 6,180,416 B1 | 1/2001 | Kurnik et al. |
| 6,211,129 B1 | 4/2001 | Gladfelter et al. |
| 6,398,961 B1 | 6/2002 | Wei et al. |
| 6,455,484 B1 | 9/2002 | Gladfelter et al. |
| 6,698,464 B2 | 3/2004 | Hennemann et al. |
| 6,764,212 B1 | 7/2004 | Nitta et al. |
| 6,892,143 B2 | 5/2005 | Howes, Jr. et al. |
| 7,092,793 B2 | 8/2006 | Peterson et al. |
| 7,153,690 B2 | 12/2006 | Stevens et al. |
| 7,347,934 B2 | 3/2008 | King et al. |
| 7,372,039 B2 | 5/2008 | Tokhtuev et al. |
| 7,476,333 B2 | 1/2009 | Martin |
| 7,550,746 B2 | 6/2009 | Tokhtuev et al. |
| 7,584,762 B2 | 9/2009 | Howes, Jr. et al. |
| 7,651,663 B2 | 1/2010 | Ayala et al. |
| 7,658,088 B2 | 2/2010 | Walker et al. |
| 7,794,607 B2 | 9/2010 | Martin |
| 7,807,473 B2 | 10/2010 | Potyrailo et al. |
| 7,810,987 B2 | 10/2010 | Hildreth |
| 8,071,390 B2 | 12/2011 | Tokhtuev et al. |
| 8,082,764 B2 | 12/2011 | Howes, Jr. et al. |
| 8,084,756 B2 | 12/2011 | Tokhtuev et al. |
| 8,269,193 B2 | 9/2012 | Christensen et al. |
| 8,285,523 B2 | 10/2012 | Mandal et al. |
| 8,373,140 B2 | 2/2013 | Tokhtuev et al. |
| 8,521,335 B2 | 8/2013 | Gutierrez-Wolf et al. |
| 8,772,184 B2 | 7/2014 | Farrugia et al. |
| 8,990,972 B2 | 3/2015 | Lopaciuk |
| 9,007,075 B2 | 4/2015 | Mahabadi et al. |
| 9,110,049 B2 | 8/2015 | Tokhtuev et al. |
| 9,228,977 B2 | 1/2016 | Mahabadi et al. |
| 9,421,566 B2 | 8/2016 | Harris et al. |
| 2002/0192718 A1 | 12/2002 | Tom-Moy et al. |
| 2003/0059483 A1 | 3/2003 | Sowle et al. |
| 2008/0270039 A1 | 10/2008 | Dunn et al. |
| 2010/0039252 A1 | 2/2010 | Barkus |
| 2010/0190265 A1 | 7/2010 | Dufva et al. |
| 2013/0233796 A1 | 9/2013 | Rao et al. |
| 2014/0026971 A1 | 1/2014 | Roach et al. |
| 2014/0369886 A1 | 12/2014 | King et al. |
| 2016/0003791 A1 | 1/2016 | Lebedev et al. |
| 2016/0120391 A1 | 5/2016 | Freudenberg et al. |
| 2017/0153217 A1 | 6/2017 | Johnston |
| 2019/0389716 A1 | 12/2019 | O'Brien |

FOREIGN PATENT DOCUMENTS

| | | | | |
|---|---|---|---|---|
| BR | PI0620149 B1 | 4/2018 | | |
| CA | 1068020 A1 | 12/1979 | | |
| CA | 2805099 A1 | 7/2014 | | |
| CA | 2789968 C | 6/2018 | | |
| CN | 1509213 A | * 4/2002 | ............. | B05B 3/10 |
| CN | 101262933 A | 9/2008 | | |
| CN | 101699276 A | 4/2010 | | |
| CN | 101393183 B | 6/2011 | | |
| CN | 102087257 A | 6/2011 | | |
| CN | 101532950 B | 9/2011 | | |
| CN | 101929992 B | 12/2011 | | |
| CN | 101806721 B | 5/2012 | | |
| CN | 103136601 A | 6/2013 | | |
| CN | 103323418 A | 9/2013 | | |
| CN | 102565230 B | 12/2013 | | |
| CN | 102807301 B | 1/2014 | | |
| CN | 103592399 A | 2/2014 | | |
| CN | 103613226 A | 3/2014 | | |
| CN | 105021582 A | 11/2015 | | |
| CN | 104849396 B | 6/2016 | | |
| CN | 104792957 B | 7/2016 | | |
| CN | 104897652 B | 8/2017 | | |
| CN | 107202861 A | 9/2017 | | |
| CN | 108045742 A | 5/2018 | | |
| CN | 108925556 A | 12/2018 | | |
| CN | 109501731 A | 3/2019 | | |
| EP | 1099981 A2 | 5/2001 | | |
| EP | 1155109 B1 | 4/2006 | | |
| EP | 989188 B1 | 11/2007 | | |
| GB | 1245102 A | 9/1971 | | |
| JP | S5644025 A | 4/1981 | | |
| JP | S57144084 A | 9/1982 | | |
| JP | S6319236 B2 | 4/1988 | | |
| JP | H01236991 A | 9/1989 | | |
| JP | H0230755 B2 | 7/1990 | | |
| JP | H06167449 A | 6/1994 | | |
| JP | H1116870 A | 1/1999 | | |
| JP | H11251283 A | 9/1999 | | |
| JP | H11319378 A | 11/1999 | | |
| JP | H11346973 A | 12/1999 | | |
| JP | 2000042390 A | 2/2000 | | |
| JP | 2000104310 A | 4/2000 | | |
| JP | 2000121605 A | 4/2000 | | |
| JP | 3055082 B2 | 6/2000 | | |
| JP | 2000171432 A | 6/2000 | | |
| JP | 2000183017 A | 6/2000 | | |
| JP | 2001174436 A | 6/2001 | | |
| JP | 2002214178 A | 7/2002 | | |
| JP | 2002353185 A | 12/2002 | | |
| JP | 2002355622 A | 12/2002 | | |
| JP | 2003014642 A | 1/2003 | | |
| JP | 2004077169 A | 3/2004 | | |
| JP | 3515781 B2 | 4/2004 | | |
| JP | 3787255 B2 | 6/2006 | | |
| JP | 3793381 B2 | 7/2006 | | |
| JP | 3801904 B2 | 7/2006 | | |
| JP | 3878372 B2 | 2/2007 | | |
| JP | 2007085881 A | 4/2007 | | |
| JP | 2007111575 A | 5/2007 | | |
| JP | 4309788 B2 | 8/2009 | | |
| JP | 4409010 B2 | 2/2010 | | |
| JP | 2010245367 A | 10/2010 | | |
| JP | 2011058846 A | 3/2011 | | |
| JP | 4802940 B2 | 10/2011 | | |
| JP | 5089587 B2 | 12/2012 | | |
| JP | 5441573 B2 | 3/2014 | | |
| JP | 5442705 B2 | 3/2014 | | |
| JP | 2014172013 A | 9/2014 | | |
| JP | 5704304 B2 | 4/2015 | | |
| JP | 5889167 B2 | 3/2016 | | |
| JP | 2017023917 A | 2/2017 | | |
| KR | 20050033524 A | 4/2005 | | |
| KR | 20090029931 A | * 3/2009 | ............. | A47B 77/06 |
| KR | 20110113848 A | 10/2011 | | |
| KR | 20130109549 A | 10/2013 | | |
| KR | 101329895 B1 | 11/2013 | | |
| KR | 20160112229 A | 9/2016 | | |
| KR | 20160139185 A | 12/2016 | | |
| WO | 2006112041 A1 | 10/2006 | | |
| WO | 2010103782 A1 | 9/2010 | | |
| WO | 2011121521 A2 | 10/2011 | | |
| WO | 2011121547 A2 | 10/2011 | | |
| WO | 2013009106 A2 | 1/2013 | | |
| WO | 2016194449 A1 | 12/2016 | | |
| WO | 2017199990 A1 | 11/2017 | | |
| WO | 2017200136 A1 | 11/2017 | | |

* cited by examiner

FIG. 8

SYSTEM AND TECHNIQUE FOR DETECTING CLEANING CHEMICAL USAGE TO CONTROL CLEANING EFFICACY

RELATED MATTERS

This application claims the benefit of U.S. Provisional Patent Application No. 63/089,227, filed Oct. 8, 2020, the entire contents of which are incorporated herein by reference.

TECHNICAL FIELD

This disclosure relates to the detection and control of chemical generation and/or usage, for example, to help ensure that a cleaning chemical maintains its cleaning efficacy until a time of replacement.

BACKGROUND

Ineffective cleaning can cause pathogen transmission, resulting in illnesses and infections. Implementing standardized cleaning practices is one of the best ways to protect against the acquisition and transmission of pathogens. The types of cleaning practices used will depend on the environment of operation but may include systematic handwashing, controlled food preparation techniques, systematic cleaning and sterilization of contact surfaces in the environment, and the like. Regardless of the type of cleaning practice implemented, the effectiveness of the cleaning practice will depend on an individual's compliance with the requirements established by the cleaning practice. If an individual fails to following one or more steps established by the cleaning practice, it can undermine the effectiveness of the cleaning.

For example, in environments where an individual performs hard surface cleaning—such as cleaning countertops and tables—an individual may fill a bucket with a cleaning solution, such as a sanitizing agent, that is then used to clean the surface. Cleaning protocols may dictate that the cleaning solution be periodically discarded and replaced with fresh cleaning solution to ensure the cleaning efficacy of the solution. The effectiveness of the cleaning solution may deteriorate over time and/or as the cleaning solution becomes soiled through use.

Technological aids that can help users identify and comply with cleaning practices can increase the prevalence and effectiveness of the cleaning practices. This is particularly true in industries that often experience high employee turnover and have a limited opportunity to train new employees on cleaning practices.

SUMMARY

In general, this disclosure is directed to devices, systems, and techniques for monitoring chemical generation and/or usage and indicating to a user when the chemical has expired and needs to be replaced. In some examples, a system includes a chemical reservoir in which a use solution is created by diluting a concentrated chemical with water. The system includes one or more sensors associated with the chemical reservoir that can detect user interaction with the chemical in the reservoir. For example, the reservoir may have an accelerometer, a gyroscope, and/or a pressure sensor that detects an object being placed in the reservoir. The system may track an amount of time until the chemical in the reservoir is deemed to have expired and provide a user alert indicating expiration of the chemical. The system can control the amount of time remaining until the chemical is deemed to have expired based on the detected addition of the object to the reservoir. For example, the system may start a timer or reduce the amount of time remaining until expiration in response to detecting that an object has been added to the reservoir. The system can provide any suitable user alerts, such as an audible message, a visual alert (e.g., a solid and/or blinking light), a textual message, and/or other alert indicating that the chemical in the reservoir should be discarded.

As one example, a system according to the disclosure may be implemented as a towel or sponge bucket for containing a cleaning chemical. In use, a user may fill the bucket with a cleaning chemical, e.g., by adding a concentrated cleaning chemistry to the bucket and diluting it with water or by placing the bucket under a dispenser that generates the cleaning chemistry onsite by diluting a solid and/or liquid concentrated cleaning chemistry with water. In either case, the user may place one or more cleaning implements (e.g., towels, sponges) in the bucket for subsequent use.

A cleaning protocol may specify how the user is supposed to interact with the cleaning reservoir and cleaning implement(s) to help ensure effective cleaning. For example, the cleaning protocol may dictate that the user only remove a saturated cleaning implement from the bucket for a single use and that the user is not supposed to return the soiled cleaning implement back to the bucket after use. Instead, the user may be instructed to place multiple cleaning implements in the bucket and remove a fresh cleaning implement each time more cleaning chemical and/or an unsoiled cleaning implement is needed. Additionally or alternatively, the cleaning protocol may specify that the user can only return a soiled cleaning implement to the bucket to be refreshed for continued use a certain number of times before the cleaning chemical in the bucket should be discarded.

In these and other applications, a system according to the disclosure can detect when a cleaning implement is added to the bucket containing the cleaning chemistry (in addition to or in lieu of detecting when the cleaning implement is removed from the bucket). The system can track the amount of time remaining until the cleaning chemical is deemed to have expired based on the detected addition of the cleaning implement to the bucket. For example, the cleaning chemical may have an effective lifespan measured from when the cleaning chemical is first generated that is programmed into the system. An example lifespan may range from 1 to 4 hours for certain cleaning chemicals, although other lifespans can be used. The system may initiate a timer when the cleaning chemical is generated to track the expiration time of the cleaning chemical.

Sensor data from the system can detect when an object (e.g., cleaning implement) has been added to the bucket. The system may assume that any cleaning implement added to the bucket after the initiation the cleaning process is a soiled cleaning implement being returned to the bucket (e.g., in violation of a cleaning protocol). Accordingly, the system can decrease the amount of time remaining until the cleaning chemical is deemed to have expired. This can help compensate for the reduced efficacy of the cleaning solution caused by contamination when the soiled cleaning implement was added to the bucket. The system can subsequently determine when the cleaning chemical has expired—which may be earlier than otherwise would have occurred had the user not return the soiled cleaning implement to the bucket—and issue a user alert indicating the expiration. In this way, the system can monitor usage of the bucket and provide actionable information to the user indicating that the cleaning solution needs to be discarded and/or replaced.

As another example, a system according to disclosure may be implemented as a sink, such as one compartment of a three-compartment sink used in commercial kitchen facilities. In a typical three-compartment sink arrangement, the first compartment is filled with a detergent solution to remove soil from the items being cleaned. The second compartment is a rinsing compartment for removing soil and detergent from the items. The third compartment is a sanitizing compartment, e.g., filled with a sanitizing solution for sanitizing the items being cleaned. The cleaning chemical in the first and/or third compartments may need to be periodically replaced to ensure its cleaning effectiveness.

In these and other applications, a system according to disclosure may mount a sensor on or adjacent one or more sink compartments to detect when an object is added to the compartment. The object may be a warewash object, such as a utensil, drinkware, plate, bowl, or the like. Upon detecting that the object has been added to the cleaning chemical in the compartment, the system may initiate a timer to track expiration of the cleaning chemical and/or adjust the amount of time remaining until the cleaning chemical is deemed to have expired.

In one example, a system is described that includes a reservoir, a sensor, a user interface, and a controller. The reservoir defines an opening through which a cleaning chemical can be added to the reservoir and through which an object can be placed in the cleaning chemical. The sensor is operatively coupled to the reservoir and configured to detect at least one of movement of the cleaning chemical and a pressure change of the cleaning chemical in response to the object being placed in the reservoir. The controller is communicatively coupled to the sensor and the user interface. The example specifies that the controller is configured to detect addition of the object to the reservoir based on the at least one of the movement and pressure change of the cleaning chemical detected by the sensor and track a time to expiration of the cleaning chemical added to the reservoir based on detected addition of the object to the reservoir. The example also specifies that the controller is configured to control the user interface to issue a user alert indicating expiration of the cleaning chemical.

In another example, a method is described that includes receiving a signal from a sensor operatively connected to a reservoir containing a cleaning chemical indicative of at least one of movement of the cleaning chemical in the reservoir and a pressure change of the cleaning chemical in the reservoir. The method includes determining based on analysis of the signal from the senor if the movement of the cleaning chemical or the pressure change of the cleaning chemical is attributable to an object being placed in the reservoir or a different force acting on the reservoir. The method further specifies that, if the determined movement or pressure change of the cleaning chemical is determined to be attributable to the object being placed in the reservoir, at least one of initiating a timer tracking a time to expiration of the cleaning chemical and adjusting an expiration time of the cleaning chemical. The method further involves controlling issuance of a user alert when the tracked time to expiration of the cleaning chemical reaches the expiration time of the cleaning chemical.

In another example, a system is described that includes means for holding a cleaning chemical into which a cleaning implement can be inserted, means for detecting the cleaning implement being inserted into the means for holding the cleaning chemical, and means for providing a user alert. The example system also includes means for determining that the cleaning chemical has expired based on detected insertion of the cleaning implement into the means for holding the cleaning chemical and for controlling issuance of the user alert in response to determining that the cleaning chemical has expired.

The details of one or more examples are set forth in the accompanying drawings and the description below. Other features, objects, and advantages will be apparent from the description and drawings, and from the claims.

DETAILED DESCRIPTION

This disclosure is generally directed to systems, devices, and techniques for monitoring user interaction with a chemical reservoir and chemical contained therein. In some implementations, a sensor is operatively coupled to a container for containing a cleaning chemical. For example, the sensor may be physically affixed to the container to sense movement of the container and/or chemical in the container and/or to sense pressure pulses or fluctuations of the chemical in the container. The sensor may detect user interaction with the container and/or chemical present in the container.

For example, the sensor may detect when the container is first filled with chemical, when the container containing chemical is in motion, each time a user adds an object (e.g., solid object) to the container, and/or each time a user removes the object from the container. Information detected by the sensor concerning the user's interaction with the chemical in the container can be used to control and/or adjust the measured effective life of the chemical. The container may include a user interface that conveys information concerning the state of the chemical in the container to the user. The user interface can be activated to issue one or more user alerts to the user, e.g., indicating expiration of the chemical in the container. The expiration of the chemical in the container may be determined and adjusted depending on how the user interacts with the chemical in the container, as measured by the sensor associated with the container.

Figure 1:
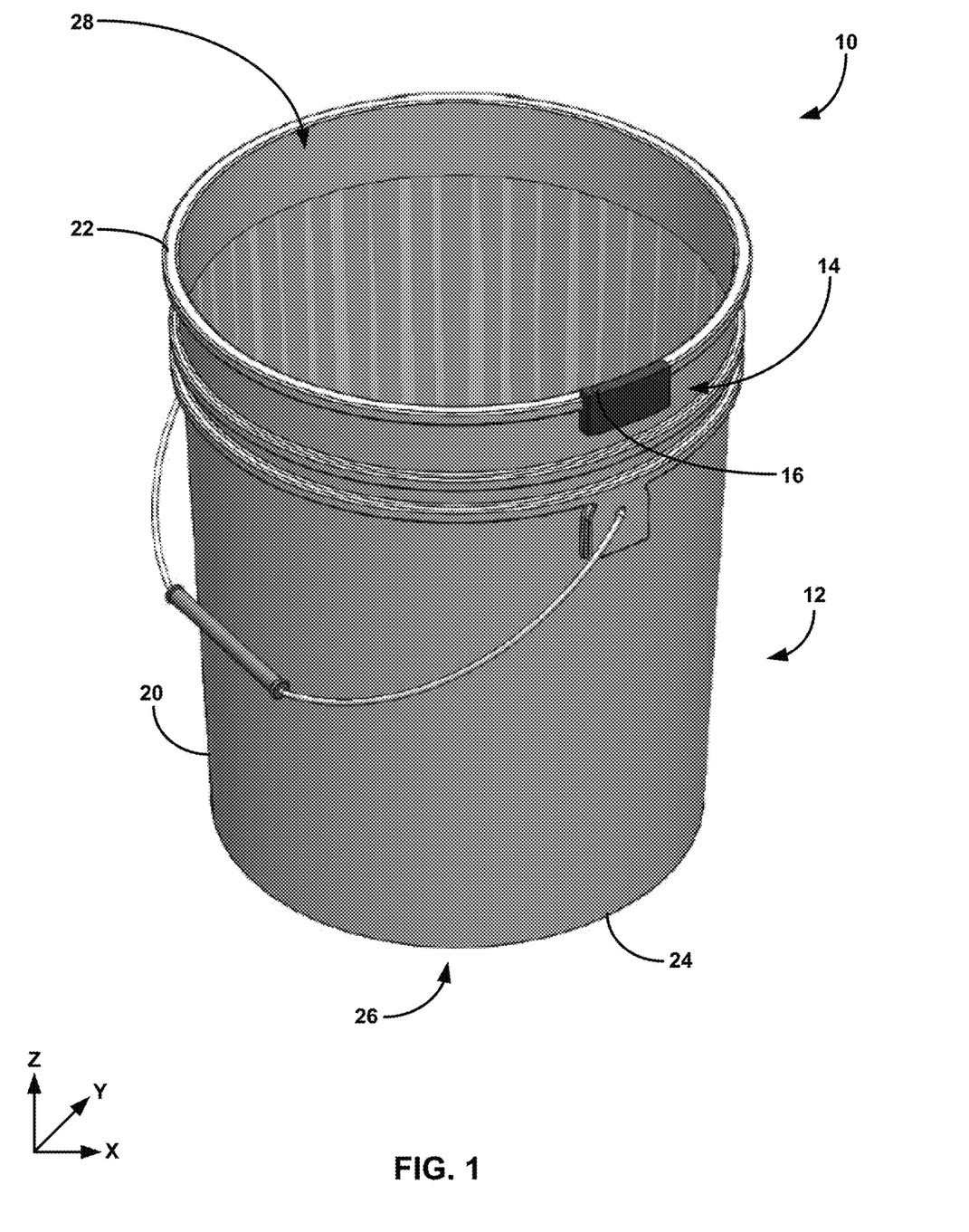
FIG. 1 is a perspective view of an example system for monitoring user interaction with a chemical in a reservoir.

FIG. 1 is a perspective view of an example system 10 for monitoring user interaction with a chemical in a reservoir. System 10 includes a reservoir 12 and a chemical usage detection device 14 that can detect user interaction with chemical in the reservoir. In use, a user can partially or fully fill reservoir 12 with a chemical to be used. Detection device 14 can detect when one or more objects are added to and/or removed from reservoir 12. To detect user interaction with the chemical in reservoir 12, detection device 14 may include one or more sensors that measure a force associated with the user adding material to and/or removing material from reservoir 12. For example, detection device 14 may include a one or more sensors that detect motion of the chemical in reservoir 12 (e.g., by detecting movement of the reservoir) and/or a pressure sensor that detects a pressure change associated with an object being placed in and/or removed from the chemical in the reservoir.

Detection device 14 can include a user interface 16 through which one or more user alerts can be conveyed to a user of system 10. In the example of FIG. 1, user interface 16 is illustrated as a light that can be controlled (e.g., turned on, turned off) to convey status information to a user of system 10. Additional or different user interface configurations can be implemented, as described in greater detail herein. In either case, user interface 16 may be controlled to alert a user when the chemical in reservoir 12 should be replaced.

For example, in operation, detection device 14 may track the amount of time remaining until the chemical in reservoir 12 is deemed to have expired. Detection device 14 may receive information indicating when to start a timer tracking the expiration of chemical added to reservoir 12. In different implementations, a user may interact with a user interface of detection device 14 (e.g., by pushing a button) to indicate when to initiate the timer and/or a sensor associated with detection device 14 may detect when the chemical is added to reservoir 12 and start the timer when the chemical is added to the reservoir.

After suitably filling reservoir 12 with chemical and initiating a timer to track a time to expiration of the chemical in the reservoir, one or more sensors associated with detection device 14 can detect user interaction with the chemical in the reservoir. For example, sensor data may detect when an object (e.g., cleaning implement) has been added to reservoir 12 and/or removed from the reservoir. The sensor may detect motion of the chemical in the reservoir and/or a pressure change (e.g., pressure pulse) of the chemical in the reservoir when an object is added to and/or removed from the chemical. Detection device 14 may distinguish between other forces measured by the one or more sensors and forces associated with an object being added to and/or removed from chemical in the reservoir. For example, detection device 14 may discriminate between movement and/or pressure data associated with an object being added to and/or removed from the reservoir and other movement and/or pressure data generated by the sensor(s) during operation, such as data indicating reservoir 12 being filled with chemical, the reservoir itself is being moved, the chemical is being held in the reservoir without user interaction, etc.

Detection device 14 can track the time to expiration of the chemical in reservoir 12 based on detected user interaction with the chemical in the reservoir. For example, when sensor data indicates that a user has added in an object to chemical in reservoir 12, the device may decrease the amount of time remaining until the chemical in the reservoir is deemed to have expired. In various implementations, detection device 14 may advance the timer monitoring the chemical forward an amount of time and/or reduce the expiration time against which the time measured by the timer is compared for determining expiration of the cleaning chemical. User interface 16 of detection device 14 can issue a user alert indicating expiration of the chemical in reservoir 12 when the time monitored by the timer is determined to have equaled or exceeded the expiration time for the chemical.

In general, reservoir 12 may be any structure configured to receive and hold liquid chemical to be used. For example, reservoir 12 may define a bounded cavity that separates the contents therein from the external environment. Reservoir 12 may be formed by at least one sidewall 20 that extends from a terminal top end 22 to a terminal bottom end 24. This can define top and bottom edges, respectively, of the reservoir. Reservoir 12 can have a closed bottom wall 26 that joins sidewall 20 at bottom end 24 of the sidewall. The top end 22 of sidewall 20 can define an opening 28 into which chemical and one or more objects can be inserted into and removed from the reservoir. In FIG. 1, opening 28 defined by reservoir 12 extends across the entire cross-section of reservoir 12 (in the X-Y plane indicated on FIG. 2) although may extend across a less portion of the cross-sectional area and/or have a different configuration than illustrated.

It should be appreciated that the descriptive terms "top" and "bottom" with respect to the configuration and orientation of components described herein are used for purposes of illustration based on the orientation in the figures. The arrangement of components in real world application may vary depending on their orientation with respect to gravity. Accordingly, unless otherwise specified, the general terms "first" and "second" may be used interchangeably with the terms "top" and "bottom" without departing from the scope of disclosure.

In the example of FIG. 1, reservoir 12 includes at least one sidewall 20. Sidewall 20 extends upwardly (in the Z-direction indicated on FIG. 1) from bottom end 24. The number of sidewalls interconnected together to form the side structure of reservoir 12 extending between the top and 22 and bottom end 24 may vary depending on the shape of the reservoir. For example, a reservoir with a circular cross-sectional shape (e.g., in the X-Y plane) may be formed of a single sidewall whereas a reservoir with a square or rectangular cross-sectional shape may be defined by four interconnected sidewalls.

In general, reservoir 12 can define any polygonal (e.g., square, hexagonal) or arcuate (e.g., circular, elliptical) shape, or even combinations of polygonal and arcuate shapes. In some examples, such as the example shown in FIG. 1, reservoir 12 is illustrated as having a circular cross-sectional shape. Reservoir 12 can be fabricated from a material that is chemically compatible with and chemically resistant to the type of chemical placed in the reservoir. In some examples, reservoir 12 is fabricated from a polymeric material, such as a molded plastic. In other examples, reservoir 12 is fabricated from a metal, such as aluminum or steel. Reservoir 12 may define any suitable capacity, such as a volume ranging from 2 L to 25 L, or from 3.5 L to 10 L, although other sized containers can also be used.

Figure 2:
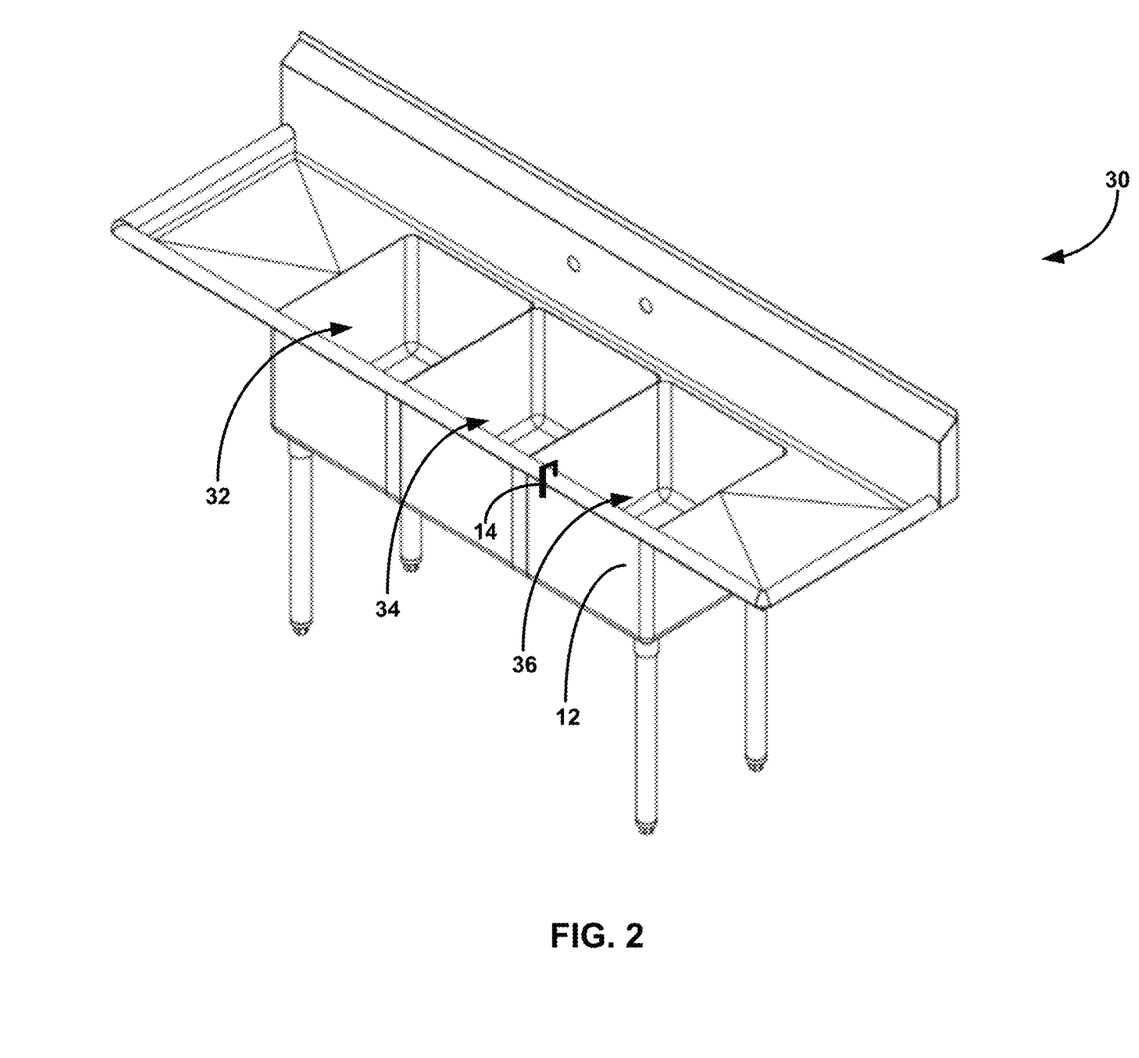
FIG. 2 is a perspective view of another example configuration of a reservoir in which the reservoir is a compartment of a multi-compartment sink.

In different examples, reservoir 12 may be designed to be movable by a user about the environment in which the reservoir is location (e.g., a towel or sponge bucket, a mop bucket on wheels) or the reservoir may be permanently affixed in the environment in which the reservoir is located (e.g., a sink basin). In FIG. 1, reservoir 12 is illustrated in the style of a bucket having a cylindrical shape. FIG. 2 is a perspective view of another example configuration of reservoir 12 in which the reservoir is a compartment of a multi-compartment sink. In particular, FIG. 2 illustrates reservoir 12 in which the reservoir is one compartment of a three-compartment sink, such as the type of three-compartment sink typically used in commercial kitchen facilities.

As shown in FIG. 2, sink 30 includes three compartments: first compartment 32, second compartment 34, and third compartment 36. Any one of the three compartments can function as reservoir 12 according to the disclosure. In typical use, first compartment 32 is filled with a detergent solution to remove soil from the items being cleaned. Second compartment 34 is a rinsing compartment for removing soil and detergent from the items. Third compartment 36 is a sanitizing compartment, e.g., filled with a sanitizing solution for sanitizing the items being cleaned. As illustrated, third compartment 36 defines reservoir 12 and includes detection device 14.

Figure 3:
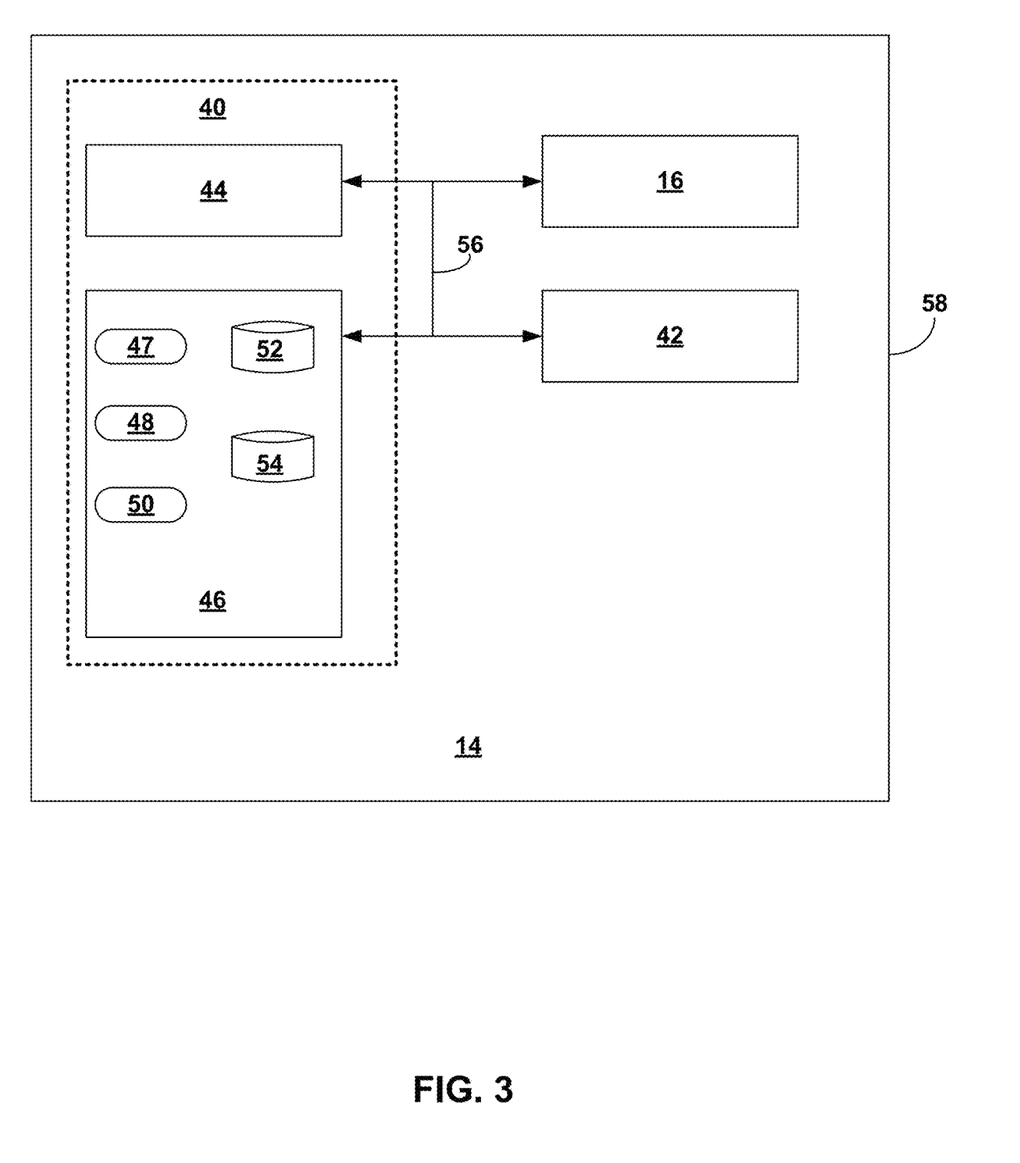
FIG. 3 is a block diagram illustrating an example configuration of a chemical usage detection device for use on the examples system of FIGS. 1 and 2.

As briefly introduced above, system 10 includes a chemical usage detection device 14 that can detect user interaction with chemical in the reservoir. FIG. 3 is a block diagram illustrating an example configuration of chemical usage detection device 14. FIG. 3 illustrates only one particular example of chemical usage detection device 14 of system 10, and other examples of device 14 may be used in other instances and may include a subset of the components, additional components, or different components than those included in the example shown in FIG. 3.

In the example of FIG. 3, detection device 14 includes a controller 40, one or more sensors 42, and a user interface 16. Controller 40 can include one or more processors 44 (collectively referred to as processor 44) and one or more storage devices 46 (collectively referred to as storage device 46). Storage device 46 of device 14 can include one or more application modules, including a user interface module 47, a sensor analysis module 48, and a timer module 50. Storage device 46 can also include one or more data stores, including a sensor comparison data store 52 and a timer comparison data store 54. Communication channels 56 may interconnect each of the components of device 14 for inter-component communications (physically, communicatively, and/or operatively). In some examples, communication channels 56 may include a system bus, a network connection, an inter-process communication data structure, or any other method for communicating data.

Each feature of device 14 described as a module may perform operations described using software, hardware, firmware, or a mixture of hardware, software, and firmware residing in and/or executing at device 14. Device 14 may execute each module with one or multiple processors. Each module may execute as one or more services of an operating system and/or a computing platform. Each module may execute as one or more executable programs at an application layer of a computing platform.

Features described as data stores can represent any suitable storage medium for storing data that one or more modules of device 14 may access to determine user interaction with the chemical in reservoir 12 and whether the chemical in the reservoir has expired. For example, sensor comparison data store 52 may store data that sensor analysis module 48 can access to determine whether an object has been inserted into and/or removed from reservoir 12 based on data obtained from sensor 42. As another example, timer comparison data store 54 may store data that timer module 50 can access to determine whether chemical in reservoir 12 has expired and needs to be replaced. Data stores may contain lookup tables, databases, charts, graphs, functions, equations, and the like that one or more modules may access.

Sensor analysis module 48 may be implemented to determine the state of any chemical in reservoir 12, such as whether one or more objects have been introduced into the chemical in the reservoir and/or removed from the chemical in the reservoir. Sensor analysis module 48 may analyze data from sensor 42 to discriminate data corresponding to periods when an object is not being added to and/or removed from chemical in reservoir 12 from data indicating that an object has been added to and/or removed from the reservoir. In response to determining that one or more objects have been added to and/or removed from chemical in reservoir 12, timer module 50 may track a time to expiration of the chemical in the reservoir, such as adjust the amount of time remaining to expiration of the cleaning chemical.

In one implementation, system 10 may be used hold a cleaning chemical. An individual performing cleaning may wet one or more cleaning implements in the cleaning chemical contained within reservoir 12. Example cleaning implements include towels, sponges, mops, brushes, and other objects that can be wetted with cleaning chemical from reservoir 12 and used to apply the cleaning chemical to a surface being cleaned along with rubbing and/or agitation by the surface of the cleaning implement.

The individual performing cleaning may be provided with a protocol dictating how the individual is supposed to add and remove a cleaning implement from reservoir 12. For example, the protocol may dictate that the individual should add one or multiple unsoiled cleaning implements (e.g., cloth or paper towels, sponges) to reservoir 12 upon filling with fresh cleaning chemical. An unsoiled cleaning implement is one that does not contain soil (e.g., one that has not already been utilized to clean a soiled surface during the current cleaning event). The cleaning protocol may dictate that, in subsequent use, the individual should remove the wetted, unsoiled cleaning implement from the reservoir, use the cleaning implement to clean one or more desired surfaces, and then discard the soiled cleaning implement or place the soiled cleaning implement in a location to be re-cleaned. Accordingly, the protocol may specify that the individual should not take the soiled cleaning implement and reintroduce it back into reservoir 12 to be re-wetted and/or to clean soil off of the cleaning implement with the cleaning chemical in the reservoir. Rather, in these examples, the individual may be instructed to take a fresh cleaning implement from the reservoir each time additional cleaning chemical and/or an unsoiled cleaning surface is needed.

During use of reservoir 12, device 14 may generate and/or receive information concerning user interaction with reservoir 12 and/or chemical in the reservoir. For example, sensor 42 may generate data concerning the movement of cleaning chemical in reservoir 12 and/or pressure changes of the cleaning chemical in the reservoir associated with an object being introduced in and/or removed from reservoir 12. Sensor analysis module 48 may receive the data from sensor 42 and analyze the data with reference to comparative data stored at sensor comparison data store 52. Sensor comparison data store 52 may contain data corresponding to one or more objects being added to and/or removed from reservoir 12.

For example, prior to deploying system 10 for use, comparison data may be generated in which reservoir 12 is filled with the type of chemical expected to be placed in reservoir 12 during subsequent use. Sensor 42 can generate data while various comparative actions are performed on reservoir 12 and/or chemical in the reservoir. For example, sensor 42 may generate data while reservoir 12 is filled with chemical, data while the chemical is held stationary in reservoir 12 without user interaction, data while reservoir 12 is moved without interacting with the chemical in the reservoir, and/or data while one or more objects are introduced into and/or removed from chemical in the reservoir. Sensor data associated with an object being introduced into and/or removed from reservoir 12 may provide a unique signature, or comparative data set, that distinguishes the sensor data associated with introducing an object into and/or removing an object from chemical in the reservoir from other types of data generated by sensor 42 during the use of reservoir 12. Sensor comparison data store 52 may contain data, e.g., in the form of one or more signal signatures, one or more thresholds, and/or other features that sensor analysis module 48 can use to analyze sensor data generated by sensor 42 to determine when an object is introduced into and/or removed from reservoir 12.

Timer module 50 may track a time to expiration of the chemical added to reservoir 12 based on the detected addition of one or more objects to reservoir 12 and, more particularly, chemical contained in the reservoir. For example, in response to sensor analysis module 48 determining that an object has been added to and/or removed from reservoir 12, timer module 50 may control a monitored time to expiration of the chemical in the reservoir. In one example, timer module 50 may initiate a timer upon determining that an object has been added to and/or removed from reservoir 12. For instance, when system 10 is implemented in a warewash environment, the addition of a warewash object (e.g., utensil, drinkware, dining dish) to reservoir 12 may be used to initiate the start of a timer for monitoring the expiration of chemical in the reservoir.

In other examples, timer module 50 may adjust (e.g., increase, decrease) an amount of time remaining until the chemical in the reservoir is deemed expired in response to sensor analysis module 48 determining that an object has been added to and/or removed from reservoir 12 based on sensor data generated by sensor 42. For example, timer module 50 may decrease an amount of time remaining until chemical in reservoir 12 is deemed expired in response to determining that an object has been added to the reservoir based on sensor data. In implementations where a cleaning protocol associated with system 10 dictates that the user not return a soiled cleaning implementation to reservoir 12, detection that an object has been added to reservoir 12 may indicate that a user has improperly returned a soiled cleaning implement to the reservoir. Accordingly, timer module 50 may respond by reducing the remaining lifespan of chemical in reservoir 12 until the chemical is deemed expired.

When timer module 50 is configured to reduce an amount of time remaining until the chemical in reservoir 12 is deemed to be expired, the timer module may reduce the amount of time remaining any suitable amount. In one example, timer module 50 reduces the entire amount of time remaining and immediately deems the chemical in the reservoir expired upon sensor analysis module 48 determining that an object has been added to the reservoir. In another example, timer module 50 reduces the amount of time remaining until the chemical in reservoir 12 is deemed to be expired a given amount of time. For example, timer module 50 may reduce the amount of time remaining until the chemical reservoir 12 is deemed to be expired by amount of time ranging from one minute to one hour, such as from two minutes to 30 minutes, or from three minutes to 15 minutes (e.g., approximately five minutes, approximately 10 minutes) in response to sensor analysis module 48 determining that object has been added to the reservoir.

In some examples, timer module 50 decreases the amount of time remaining until the chemical in reservoir 12 is deemed to be expired each time an object is determined by sensor analysis module 48 to have been added to the reservoir. In practice, a user may return a soiled cleaning implement to reservoir 12 for re-wetting and/or cleaning multiple times during a cleaning event. Accordingly, timer module 50 may decrease the amount of time remaining until the chemical in reservoir 12 is deemed to be expired each time an object (e.g., the soiled cleaning implement) is detected to have been added to reservoir 12 based on sensor data generated by sensor 42. Timer module 50 may decrease the amount of time remaining until the chemical in reservoir 12 is deemed to be expired the same amount each time an object is detected to have been added to reservoir 12, or the timer module may decrease the amount of time remaining different amounts associated with different instances of one or more objects being added to the reservoir. For example, timer module 50 may reduce the amount of time remaining until the chemical in reservoir 12 is deemed to be expired by increasingly larger amounts of time each time another object is detected as having been added to reservoir 12. Timer module 50 may reduce the amount of time remaining by accelerating a tracked time until expiration and/or shifting an expiration threshold against which the tracked time is compared to determine expiration of the chemical in reservoir 12.

Timer comparison data store 54 may store data used by timer module 50 to perform the functions described as being attributable to the module herein. For example, timer comparison data store 54 may store data indicating when a timer was initiated, terminated, and/or an amount of time remaining until the chemical in reservoir 12 is deemed expired. Timer comparison data store 54 may also store an expiration time associated with the chemical added to reservoir 12. The expiration time may be the amount of time associated with the chemical in reservoir 12 before the chemical in the reservoir is deemed to be expired (e.g., before being subject to any upward and/or downward adjustment as discussed herein). The expiration time may be programmed into device 14, for example by a manufacturer based on the intended type of chemical to be used with reservoir 12. Alternatively, in other implementations, a user may program the expiration time via user interface 16, and the expiration time may be adjusted depending on the specific chemical used in reservoir 12 at any given time.

While the expiration time may vary depending on the specific chemical added to reservoir 12, in some examples, the expiration time is a value falling within a range from 30 minutes to one day, such as from one hour to 12 hours, one hour to eight hours, one hour to four hours, or two hours to four hours. The expiration time may be measured from the start of the timer by timer module 50 and, in some examples, may generally correspond to when the chemical in reservoir 12 is generated. Chemical introduced into reservoir 12 may, in some examples, be generated by diluting a concentrated form of the chemical with water, such as diluting a liquid concentrate with water or eroding one or more solid forms of the chemical with water to generate a comparatively dilute form of the chemical in reservoir 12.

In some implementations, the expiration time of the chemical in reservoir 12 corresponds to an expected time when the effectiveness of the chemical is expected to deteriorate to a point where the chemical does not provide desired cleaning efficacy. The effectiveness of the chemical may deteriorate over time as, for example, one or more active molecules in the chemical breakdown, the chemical becomes diluted with use, and/or the active molecule(s) in the chemical are consumed through contact with soil (e.g., dirt, pathogens). Since the effectiveness of the chemical may vary case-by-case depending on the operating environment and conditions, the actual cleaning effectiveness of the chemical may vary and may still be sufficiently efficacious even when the expiration time has been reached. In this regard, the expiration time used by system 10 (at which point the chemical in reservoir 12 is deemed expired and should be replaced) may have a margin of safety build into the time such that the chemical is deemed expired even though the chemical may still have sufficient activity to continue being used.

Timer module 50 may determine when to start a timer against which the expiration time for the chemical in reservoir 12 is compared for tracking the time to expiration of the chemical. In one example, sensor analysis module 48 may analyze data from sensor 42 with reference to sensor comparison data store 52 to detect when reservoir 12 is being filled with liquid (e.g., chemical). Timer module 50 may initiate a timer in response to sensor analysis module 48 determining that reservoir 12 is being or has been filled with liquid according to sensor data generated by sensor 42. In another example, a user may interact with device 14 via user interface 16 (e.g., by pushing a button) to indicate when reservoir 12 has been filled with chemical and timer module 50 should initiate the timer.

In the example of FIG. 3, device 14 includes a user interface module 47. User interface module 47 may cause user interface 16 to issue one or more user alerts indicating expiration of the chemical in reservoir 12, e.g., in response to timer module 50 determining that the chemical in reservoir 12 has expired. User interface 16 may include one or more output devices to present visual, audible, and/or tactile output. In some examples, user interface 16 may also include one or more input devices to receive input from a user (e.g., buttons, touch screen display). In any configuration, user interface module 47 may cause user interface to present a user alert indicating expiration of the cleaning chemical as determined by timer module 50.

User interface module 47 may cause user interface 16 to present audible output (e.g., sounds), visual output (e.g., one or more lights, display screen indication), and/or other types of output (e.g., haptic feedback, etc.). The output may be responsive to timer module 50 comparing the monitored time to the expiration time of the chemical (e.g., which may be adjusted in response to detecting one or more objects being added to reservoir 12) and determining that the monitored time equals or exceeds the expiration time for the chemical. In a comparatively simple implementation, a circuit may be closed or opened to activate or deactivate one or more lights and/or to initiate a blinking light, to alert the user that the chemical in the reservoir has expired.

In some examples, timer module 50 may monitor one or more warning times occurring prior to the expiration time for the chemical in reservoir 12 with reference to timer comparison data store 54. User interface module 47 may control user interface 16 to issue one or more user alerts corresponding to the one or more warning times being equaled or exceeded, as determined by timer module 50. The warning times may provide an early indication to the user that the chemical in reservoir 12 is coming close to expiration prior to the expiration time being reached. A warning time may be established any suitable period of time prior to the expiration time for the chemical, e.g., such as a time ranging from five minutes to one hour, or from five minutes to 20 minutes, prior to expiration. User interface module 47 may control user interface 16 to present any suitable type of output indicating the warning. For example, user interface 16 may issue an audible warning. As another example, user interface 16 may have a green, yellow, red light arrangement, with the yellow light being activated at the warning time and the red light being activated at the expiration time.

As still another example, user interface 16 may have a single light that starts blinking at the warning time and transitions to emitting without blinking at the expiration time.

Although not illustrated on FIG. 3, device 14 may include one or more communication units that may communicate with external devices (e.g., a remote computing system) via one or more networks by transmitting and/or receiving network signals on the one or more networks. For example, device 14 may use a communication unit to send and receive data to and from a remote computing system using, for example, radio signals such as on a cellular radio network, a short-wave radio network, and/or a wireless Ethernet network radio network. Device 14 may send and/or receive any of the data described herein as being used or generated by the device to a remote computing system. Further, while device 14 is described as locally performing the functions attributed to the device herein, some or all of the functions may be performed by a remote computing system and communicated locally to device 14.

Storage device 46 may include one or more non-transitory computer-readable storage media. Storage devices 46 may be configured to store data in a short-term memory, such as volatile memory, and/or in a long-term memory, such as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage device 46 may store program instructions and/or data for performing the features and functions described herein as being performed by any module, device, and/or system.

One or more processors 44 may implement the functionality and/or execute instructions within device 14. For example, processor 44 in device 14 may receive and execute instructions stored by storage device 46 that execute the functionality of user interface module 47, sensor analysis module 48, and timer module 50. These instructions executed by processor 44 may cause device 14 to store information, within storage device 46, during program execution.

FIG. 3 illustrates device 14 including one or more sensors 42 that can generate information indicating an external user is interacting with chemical in reservoir 12, e.g., by inserting an object into and/or removing an object from the chemical. A variety of different sensors may be used to detect user interaction with the chemical in the reservoir including a microphone, camera, accelerometer, gyroscope, pressure sensor, optical sensor, thermal sensor, conductivity sensor, and the like. In some specific implementations, sensor 42 is configured to detect motion of the chemical in reservoir 12 in response to a user interacting with the chemical in the reservoir. Sensor 42 may detect motion by generating movement data in response to reservoir 12 and/or the chemical in the reservoir moving. Examples of such sensors include an accelerometer and/or a gyroscope, which may be single axis or multi-axis (e.g., 3-axis) sensors. For example, sensor 42 may be implemented using an inertial measurement unit (IMU) axis that generates acceleration and gyroscopic signals in each of the x, y, and z axes.

Additionally or alternatively, sensor 42 may detect motion of the chemical in reservoir 12 caused by user inserting an object into and/or removing an object from the chemical by detecting a pressure change in the reservoir. The pressure change may be caused by one or more pressure pulses associated with the introduction of the object into the chemical and/or the removal of the object from the chemical.

Independent of the specific configuration of sensor 42, the sensor may be positioned relative to reservoir 12 and/or chemical in the reservoir to measure changes to the chemical in the reservoir caused by a user's interaction with the chemical. To do this, sensor 42 (or a component thereof, such as a membrane or interface) may be positioned in reservoir 12 to contact chemical present in the reservoir. When chemical in reservoir 12 moves in response to a user interacting with the chemical, sensor 42 or a component thereof may be in contact with the liquid to detect movement of the liquid and/or pressure pulses associated with movement of the liquid. Accordingly, while sensor 42 is illustrated as being contained within a housing 58 of device 14, it should be appreciated that the entirety of the sensor or at least a portion of the sensor may be located outside of the housing that partially or fully containing controller 40 and/or user interface 16 without departing from the scope of the disclosure.

Figure 4:
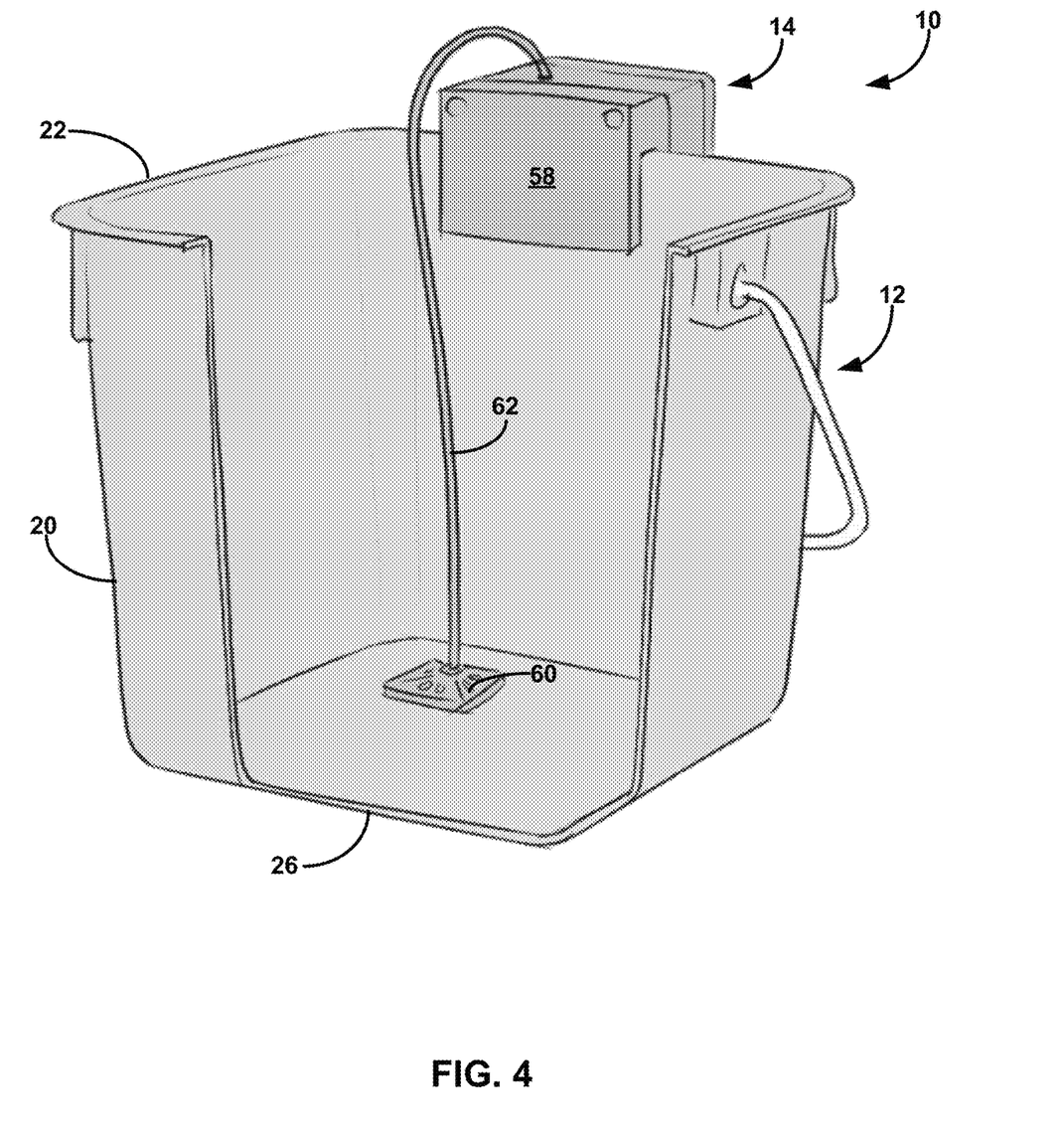
FIG. 4 is a cutout perspective view of a system showing an example implementation of a sensor in the system.

FIG. 4 is a cutout perspective view of system 10 showing an example implementation of sensor 42 in the system. In this example, sensor 42 includes a fluid port 60 mounted adjacent a bottom wall 26 of reservoir 12. In particular, in the illustrated arrangement, fluid port 60 is mounted on the bottom wall 26 of the reservoir. A conduit 62 (e.g., fluid conduit, electrical conduit, optical conduit) extends from fluid port 60 out of reservoir 12 to device 14 for communicating a signal associated with movement of chemical in reservoir 12 to controller 40 in device 14. In one example where sensor 42 is a pressure sensor, fluid port 60 may include a housing the defines one or more openings through which chemical in reservoir 12 can communicate. As chemical moves within the reservoir, e.g., in response to the user inserting an object into the reservoir, the fluid movement may cause one or more pressure pulses that propagate through the openings in fluid port 60 for generating data by sensor 42 associated with the pressure pulses.

In general, sensor 42 (or at least a component thereof) may be operably coupled to reservoir 12 in any such arrangement that allows the sensor to measure a user's interaction with the reservoir, e.g., such as by filling the reservoir with chemical and/or inserting an object into or removing an object from the reservoir. In some examples, sensor 42 (or at least a component thereof) is physically attached to reservoir 12 so as to position the sensor relative to the reservoir for generating appropriate sensed signal data. Additionally or alternatively, sensor 42 (or a component thereof) may be physically separate from reservoir 12 but operably coupled thereto via conduit 62 that conveys a signal associated with movement of chemical inside the reservoir to the sensor or other component thereof.

Independent of the specific positioning of sensor 42, housing 58 of device 14 may be positioned at a variety of locations relative to reservoir 12. In some implementations, housing 58 can be fabricated as a separate component from reservoir 12 that can then be engaged or interlocked with the reservoir. Alternatively, housing 58 may be permanently integrated into reservoir 12, e.g., by molding the features together, permanently joining the features together such that the features cannot be detached without damaging the features, or otherwise inseparably integrating the housing with the reservoir.

In the example of FIGS. 1 and 4, housing 58 of device 14 is illustrated as being removable from but interlockable with reservoir 12. In particular, housing 58 is illustrated as defining a slot 64 that is positioned over the edge defined by terminal top end 22 of upwardly-extending sidewall 20. In these and other configurations, device 14 may be installed on a variety of different reservoir configurations—and may even be moved from one reservoir to another reservoir—rather than requiring a purpose-built reservoir containing the device. Accordingly, the features and functionalities described as being attributable to device 14 herein can be used on either in a detachable/removal configuration from reservoir 12 or be permanently integrated with the reservoir.

Reservoir 12 may receive and hold any desired type of chemical. Example chemicals that may be introduced into reservoir 12 include, but are not limited to, cleaning chemicals such as a detergent, a sanitizer (e.g., a chlorine-base sanitizing agent, an iodine-based sanitizing agent, a quaternary ammonium salt-based sanitizing agent, an acid-anionic-based sanitizing agent), a degreaser, and the like and non-cleaning chemicals (e.g., a lubricant). The chemical may typically be in a liquid form although in other applications may be in a pseudo-solid/liquid form, such as a gel or paste.

Figure 5:
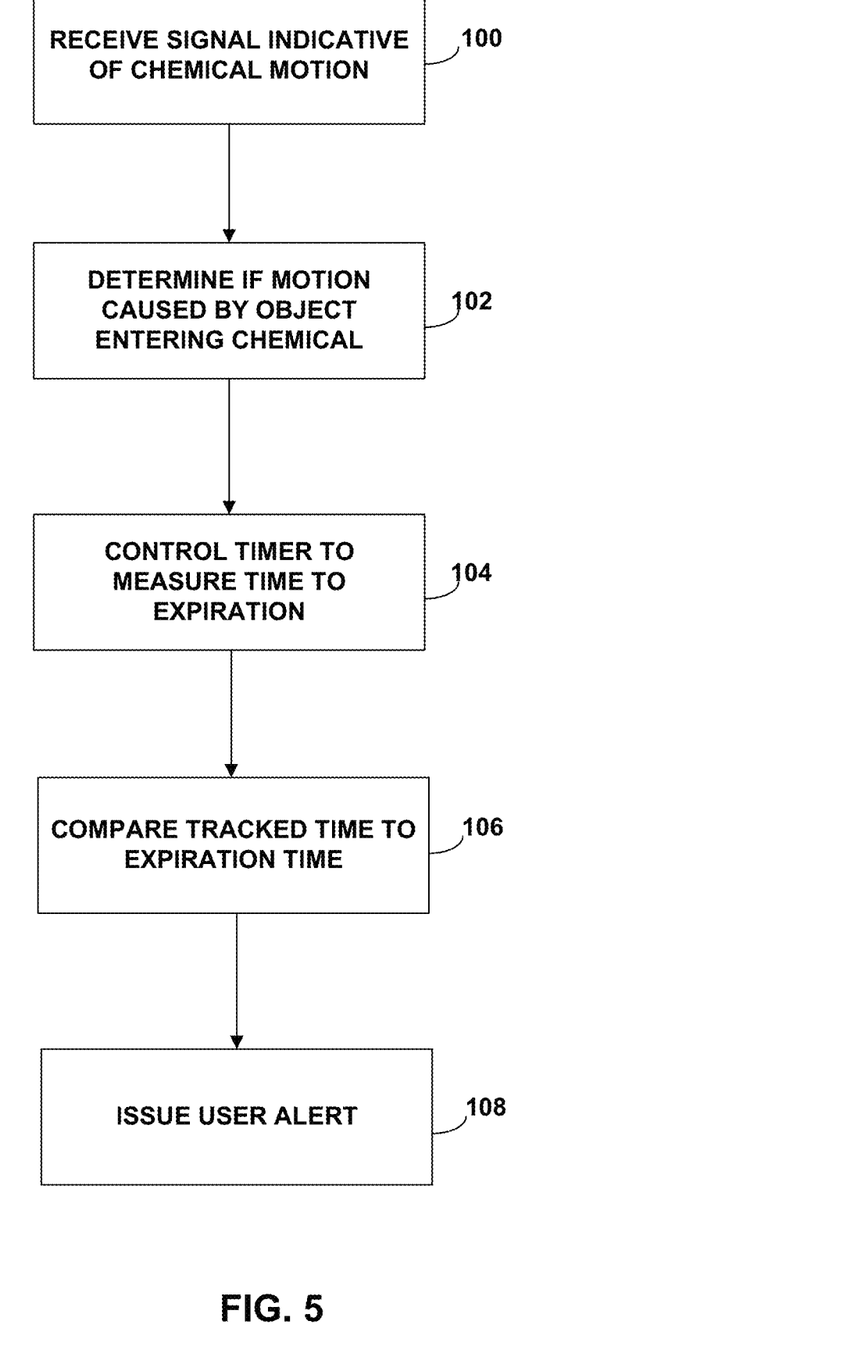
FIG. 5 is a flow diagram illustrating an example technique by which a user can interact with a reservoir and by which a controller can receive and process data corresponding to the user interaction.

FIG. 5 is a flow diagram illustrating an example technique by which a user can interact with reservoir 12 and by which controller 40 can receive and process data corresponding to the user interaction. The example technique of FIG. 5 is described with respect to a user inserting a cleaning implement into a reservoir containing cleaning chemical, although can be preformed in other situations as described herein.

The example technique of FIG. 5 includes controller 40 receiving a signal from sensor 42, which is operatively connected to reservoir 12 (100). In use, reservoir 12 may be filled with a cleaning chemical, such as a detergent and/or sterilizing chemical. A user may insert an object, such as a cleaning implement, a warewash item, or yet other item that is desirably contacted with the cleaning chemical, into reservoir 12. As the object enters the liquid cleaning chemical within reservoir 12, the object may cause the liquid within the reservoir to move (e.g., splash up and down and/or side to side). Sensor 42 can detect this movement, e.g., by detecting an acceleration associated with the movement of the liquid and/or detecting a pressure pulse associated with movement of liquid. Controller 40 can receive data from sensor 42 indicative of the detected movement of the cleaning liquid. Controller 40 may also receive other data from sensor 42 indicative of movement of the cleaning chemical caused by forces other than the object being placed in the cleaning chemical (e.g., the cleaning chemical being filled in reservoir 12, the entire reservoir being moved).

In the example technique, sensor analysis module 48 of controller 40 analyzes the signal received from sensor 42 to determine if movement of the cleaning liquid (which may be a pressure change of the cleaning liquid) is attributable to an object being placed in reservoir 12 or a different force acting on the reservoir (102). With reference to sensor comparison data store 52, sensor analysis module 48 may analyze the signal received from sensor 42 to determine if the sense data is indicative of an object being placed in the cleaning chemical or some other action being performed (e.g., the reservoir filling, the reservoir being moved, an object being removed from the reservoir) that is not associated with an object being inserted into reservoir. Sensor comparison data store 52 may store comparative data generated during calibration that identifies signal characteristics associated with an object being placed in the cleaning chemical in reservoir 12 and distinguishes from other signal characteristics not associated with such an action. The comparative data may be stored in the form of a signature signal, one or more feature characteristics for the signal, one or more threshold values, and/or other data against which the sensor signal generated by sensor 42 can be analyzed to determine whether movement (e.g., pressure change) sensed by sensor 42 is associated with an object being placed in the reservoir or yet other force acting on the reservoir or cleaning chemical therein.

In the technique of FIG. 5, timer module 50 controls tracking of a time to expiration for the cleaning chemical in reservoir 12 in response to sensor analysis module 48 determining that an object was placed in reservoir 12 (104). For example, in response to sensor analysis module 48 determining that an object has been placed in reservoir 12, timer module 50 may initiate a timer tracking a time to expiration of the cleaning chemical in reservoir 12 and/or timer module 50 may adjust the amount of time remaining until expiration of the cleaning chemical.

In some implementations, timer module 50 may initiate a timer tracking a time to expiration of the cleaning chemical prior to sensor analysis module 48 detecting that an object has been added to the cleaning chemical in reservoir 12. For example, a user may provide an input via user interface 16 indicating that cleaning chemical has been added to reservoir 12, causing timer module 50 to start a timer tracking a time to expiration of the cleaning chemical. As another example, sensor analysis module 48 may detect that cleaning chemical is added to reservoir 12 (based on sensor data from sensor 42 and comparative data indicative of filling in sensor comparison data store 52), and timer module 50 may initiate a timer in response. In any implementation, timer module 50 may track a time to expiration in any suitable way, e.g., such as counting up from a zero value, counting down from an expiration time, logging start and/or stop times, or other suitable way to track time.

In some instances where timer module 50 adjusts the amount of time remaining until the cleaning chemical in reservoir 12 is deemed expired in response to detecting that an object has been placed in the cleaning chemical, the timer module may reduce the amount of time remaining until expiration. For example, timer module 50 may reduce the amount of time remaining until the chemical in reservoir 12 is deemed expired an amount of time each instance an object is detected entering the cleaning chemical. As a result, the cleaning chemical may be deemed to be expired earlier than if the user had not otherwise introduced one or more objects into the cleaning chemical during use.

When the object in question is a cleaning implement intended to be wetted with the cleaning chemical, it should be appreciated that the user necessarily will need to insert the cleaning implement into the chemical in reservoir 12 at some point during the cleaning event. A cleaning protocol may dictate when the user should insert the one or more unsoiled cleaning implement(s) into the reservoir, e.g., such as prior to filling the reservoir with cleaning chemical or immediately after filling the reservoir with cleaning chemical. In this regard, in some implementations, timer module 50 may be configured to not make any adjustments to the expiration time of the cleaning chemical for objects detected as being added to the reservoir within a threshold amount of time of the timer starting and/or the reservoir being filled. In these situations, an object introduced into the cleaning chemical in the reservoir at the start of the cleaning event may be assumed to be a clean, unsoiled cleaning implement that does not necessitate a change in the expiration time of the cleaning chemical.

With further reference to FIG. 5, controller 40 of device 14 and, more particularly, timer module 50 of controller 40, may compare the tracked time to expiration for the cleaning chemical in reservoir 12 to an expiration time for the cleaning chemical with reference to timer comparison data store 54 (106). The tracked time and/or the expiration time for the cleaning chemical may have been adjusted in response to the detection of an object entering the cleaning chemical. In either case, the chemical in reservoir 12 may be deemed expired when timer module 50 determines that the track time equals and/or exceeds the expiration time for the cleaning chemical.

In response to determining that the cleaning chemical reservoir 12 has expired, user interface module 47 can control user interface 16 to issue a user alert (108). The user alert may indicate to the user of system 10 that the cleaning chemical in reservoir 12 has expired and should no longer be used. Accordingly, the user of system 10 may cease using the cleaning chemical and may instead discard the cleaning chemical and, optionally, refill reservoir 12 with a fresh batch of the cleaning chemical.

In the examples described above, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses. Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The following example may provide additional details on chemical reservoir user interaction detection systems and techniques according to the disclosure.

Example 1

An inertial measurement unit containing a 3-axis accelerometer and a 3-axis gyroscope was placed in a towel bucket. The towel bucket was filled with liquid so the inertial measurement unit was submerged within the liquid. A variety of movement actions were then performed with the towel bucket to evaluate the signal response from the inertial measurement unit. The movement actions include: moving the entire bucket, introducing multiple rags into the bucket to be wetted, and then dumping the bucket.

Figure 6:
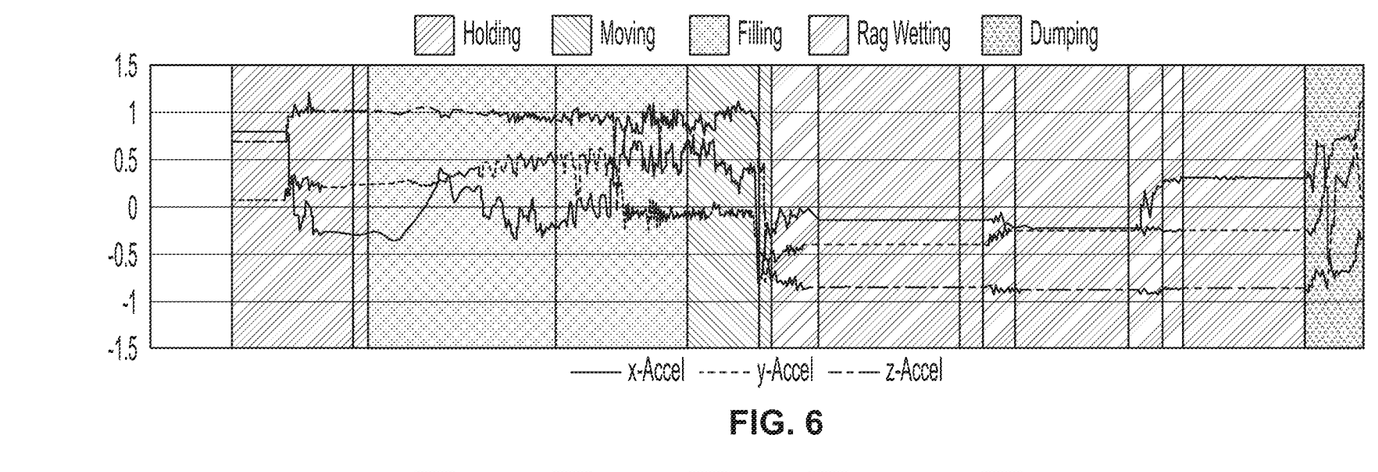
FIGS. 6 and 7 are plots illustrating accelerometer and gyroscopic signal data, respectively, versus time for an experiment.
Figure 7:
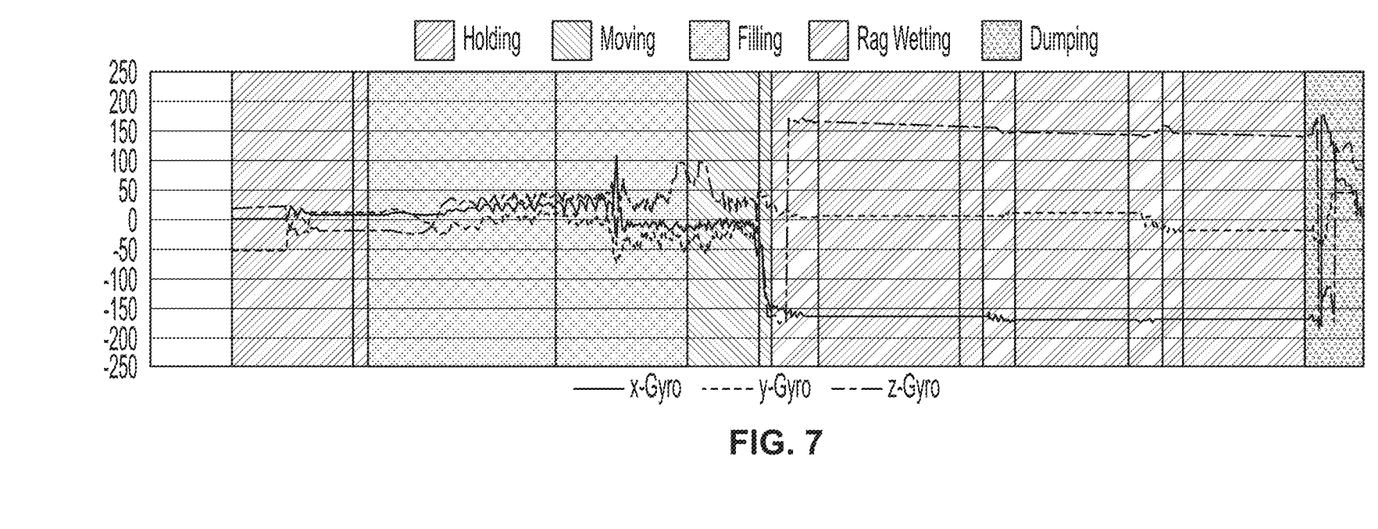

FIGS. 6 and 7 are plots illustrating the accelerometer and gyroscopic signal data, respectively, versus time from the experiment. The data illustrate a discriminated signal response associated with the rags being inserted into liquid in the bucket, which can be used to control the measured expiration life of the chemical.

Example 2

Figure 8:
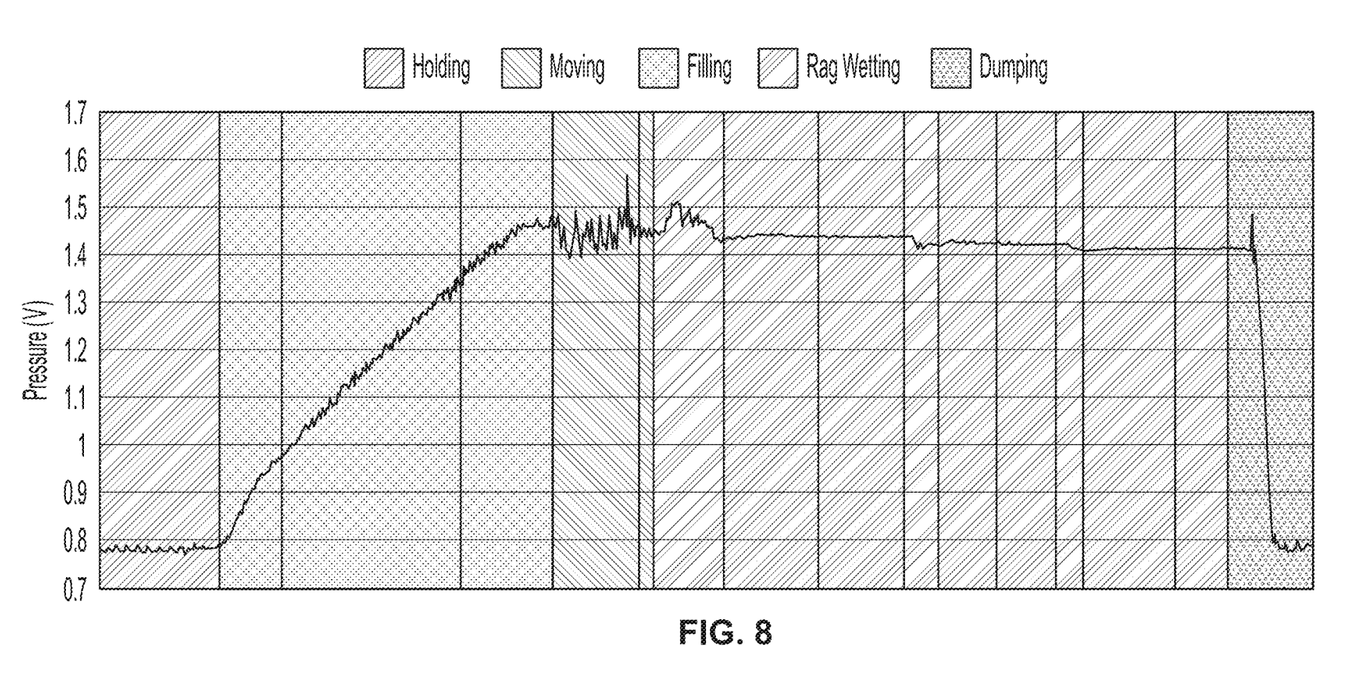
FIG. 8 is a plot of pressure signal data versus time for an experiment.

The experimental apparatus and conditions in Example 1 above were repeated expect with the inertial measurement unit being replaced by a pressure sensor. FIG. 8 is a plot of the pressure signal data versus time from the experiment. The data again illustrate a discriminated signal response associated with the rags being inserted into liquid in the bucket, which can be used to control the measured expiration life of the chemical.

The invention claimed is:

1. A system comprising:
a reservoir defining an opening through which a cleaning chemical can be added to the reservoir and through which an object can be placed in the cleaning chemical;
a sensor operatively coupled to the reservoir and configured to detect at least one of movement of the cleaning chemical and a pressure change of the cleaning chemical in response to the object being placed in the reservoir;
a user interface; and
a controller communicatively coupled to the sensor and the user interface, wherein the controller is configured to:
detect addition of the object to the reservoir based on the at least one of the movement and pressure change of the cleaning chemical detected by the sensor;
track a time to expiration of the cleaning chemical added to the reservoir based on detected addition of the object to the reservoir; and
control the user interface to issue a user alert indicating expiration of the cleaning chemical.

2. The system of claim 1, wherein the sensor is a pressure sensor.

3. The system of claim 2, wherein the pressure sensor comprises a fluid port positioned adjacent a bottom surface of the reservoir and a conduct extending out of the reservoir for communicating a pressure signal.

4. The system of claim 1, wherein the sensor comprises a 3-axis accelerometer.

5. The system of claim 1, wherein:
the reservoir comprises a bottom wall and an upwardly-extending sidewall,
at least a portion of the sensor, the controller, and the user interface are contained within a housing, and
the housing is attached to the upwardly-extending sidewall.

6. The system of claim 5, wherein the housing defines a slot, and the slot is positioned over an edge of the upwardly-extending sidewall to attach the housing to the upwardly-extending sidewall.

7. The system of claim 1, wherein the reservoir is a bucket.

8. The system of claim 1, wherein the user interface comprises at least one of a speaker and a light, and the controller is configured to control the user interface to issue the user alert by activating at least one of the speaker and the light.

9. The system of claim 1, wherein the controller is configured to detect addition of the object to the reservoir by at least:
receiving a signal from the sensor indicating movement of the cleaning chemical or the pressure change of the cleaning chemical; and
discriminating movement of the cleaning chemical or the pressure change of the cleaning chemical associated with addition of the object to the reservoir from movement of the cleaning chemical or the pressure change of the cleaning chemical not associated with addition of the object to the reservoir.

10. The system of claim 9, wherein the controller is configured to discriminate movement of the cleaning chemical or the pressure change of the cleaning chemical associated with addition of the object to the reservoir from movement of the cleaning chemical or the pressure change of the cleaning chemical not associated with addition of the object to the reservoir by comparing the signal received from the sensor to at least one of a threshold indicating addition of the object to the cleaning chemical and a signature signal from the sensor corresponding to addition of the object to the reservoir.

11. The system of claim 1, wherein the controller is configured to track the time to expiration of the cleaning chemical added to the reservoir based on detected addition of the object to the reservoir by at least one of:
starting a timer upon addition of the object to the reservoir; and
reducing an amount of time to expiration for the cleaning chemical.

12. The system of claim 1, wherein the cleaning chemical is at least one of a sanitizing agent and a detergent, and the object is a cleaning implement for transferring the cleaning chemical from the reservoir to a surface to be cleaned.

13. A method comprising:

receiving a signal from a sensor operatively connected to a reservoir containing a cleaning chemical indicative of at least one of movement of the cleaning chemical in the reservoir and a pressure change of the cleaning chemical in the reservoir;

determining based on analysis of the signal from the senor if the movement of the cleaning chemical or the pressure change of the cleaning chemical is attributable to an object being placed in the reservoir or a different force acting on the reservoir;

if the determined movement or pressure change of the cleaning chemical is determined to be attributable to the object being placed in the reservoir, at least one of initiating a timer tracking a time to expiration of the cleaning chemical and adjusting an amount of time to expiration for the cleaning chemical; and controlling issuance of a user alert when the tracked time to expiration of the cleaning chemical reaches the expiration time of the cleaning chemical.

14. The method of claim 13, further comprising receiving an indication that the cleaning chemical has introduced to the reservoir and initiating the timer tracking the time to expiration of the cleaning chemical in response to the received indication, wherein, if the determined movement or pressure change of the cleaning chemical is determined to be attributable to the object being placed in the reservoir, reducing the expiration time of the cleaning chemical.

15. The method of claim 14, wherein:

determining based on analysis of the signal from the senor if the movement of the cleaning chemical or the pressure change of the cleaning chemical is attributable to an object being placed in the reservoir or a different force acting on the reservoir comprises determining that multiple of the objects have been placed in the reservoir, and adjusting the amount of time to expiration for the cleaning chemical comprises reducing the amount of time to expiration for each of the multiple objects determined to have been placed in the reservoir.

16. The method of claim 14, wherein the expiration time is within a range from 30 minutes to 4 hours, and reducing the expiration time comprises reducing the expiration time an amount within a range from 5 minutes to 30 minutes.

17. The method of claim 14, further comprising, prior to receiving the indication that the cleaning chemical has introduced to the reservoir and initiating the timer tracking the time to expiration of the cleaning chemical, placing multiple of the objects in the reservoir.

18. The method of claim 13, wherein the object comprises at least one of a towel and a sponge.

19. The method of claim 13, wherein the sensor is a pressure sensor and the signal is indicative of a pressure change.

20. The method of claim 19, wherein the pressure sensor comprises a fluid port positioned adjacent a bottom surface of the reservoir and a conduct extending out of the reservoir for communicating a pressure signal.

21. The system of claim 13, wherein the sensor comprises a 3-axis accelerometer.

22. The system of claim 13, wherein:

the reservoir comprises a bottom wall and an upwardly-extending sidewall, at least a portion of the sensor, the controller, and the user interface are contained within a housing, and the housing is attached to the upwardly-extending sidewall.

23. The system of claim 13, wherein the user alert is one of an audible alert issued via a speaker and a visual alert issued via a light.

24. The system of claim 13, wherein the cleaning chemical is at least one of a sanitizing agent and a detergent.

25. A system comprising:

means for holding a cleaning chemical into which a cleaning implement can be inserted;

means for detecting the cleaning implement being inserted into the means for holding the cleaning chemical means for providing a user alert; and means for determining that the cleaning chemical has expired based on detected insertion of the cleaning implement into the means for holding the cleaning chemical and for controlling issuance of the user alert in response to determining that the cleaning chemical has expired.

* * * * *